United States Patent
Perier (10) Patent No.: US 9,746,861 B2
(45) Date of Patent: Aug. 29, 2017

(54) STAND-ALONE DC POWER SYSTEM FOR NETWORKS NOT CONNECTED TO THE GRID

(71) Applicant: STMicroelectronics International N.V., Amsterdam (NL)

(72) Inventor: Laurent Perier, New Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 652 days.

(21) Appl. No.: 14/275,573

(22) Filed: May 12, 2014

(65) Prior Publication Data

US 2015/0323945 A1    Nov. 12, 2015

(51) Int. Cl.
    *G05F 1/46*    (2006.01)
    *H02J 1/00*    (2006.01)
(52) U.S. Cl.
    CPC .................. *G05F 1/46* (2013.01); *H02J 1/00* (2013.01); *Y10T 307/406* (2015.04)
(58) Field of Classification Search
    CPC ....................................................... G05F 1/46
    USPC ......................................................... 307/31
    See application file for complete search history.

(56) References Cited

U.S. PATENT DOCUMENTS 7,629,712 B2 * 12/2009 Nakashima ............... H02J 1/08
                                                            307/126
8,698,351 B2 *  4/2014 Castelaz ................... H02J 4/00
                                                             307/25

OTHER PUBLICATIONS

John Schönberger et al., "DC-Bus Signaling: A Distributed Control Strategy for a Hybrid Renewal Nanogrid," *IEEE Transactions on Industrial Electronics*, vol. 53 No. 5, Oct. 2006, pp. 1453-1460.

* cited by examiner

*Primary Examiner* — Joseph Chang
(74) *Attorney, Agent, or Firm* — Seed IP Law Group LLP (57) ABSTRACT

A stand-alone DC power network is provided with a DC to DC power converter only, and does not have a converter that will convert AC to DC. In addition, each of the different terminals that provides the DC voltage at different levels will be ranked according to priority as to which ones are the most important to supply the full voltage to, and which ones are of secondary importance in the event there is insufficient power in the system to provide full voltage at the specified current for the different loads. A processor monitors the voltage and current at each of the terminals, and in the event a current is attempted to be drawn from the system which would cause a first priority terminal to be reduced in voltage, the processor will instead reduce the power provided to the second priority terminal and ensure that the first priority terminal does not have a significant reduction in the specified voltage or the amount of current supplied to that terminal at the specified voltage.

17 Claims, 3 Drawing Sheets

STAND-ALONE DC POWER SYSTEM FOR NETWORKS NOT CONNECTED TO THE GRID

BACKGROUND

Technical Field

The embodiments as disclosed herein are in the field of stand-alone power systems and, in particular, a stand-alone DC power network that maintains consistent voltages at key locations over long periods of time.

Description of the Related Art

The electrical power grid is still far from covering many locations in a number of emerging countries, even though wide sources of energy are easily available. For example, there are many stand-alone systems which generate electricity from wind, solar power, and biomass, as well as local generators and other sources. Such isolated systems form a stand-alone grid which provides power for a local community which may vary in size from two to three homes up to several dozen homes. The systems to interface with these power sources are complex in today's environment, and contain batteries, numerous inverters, various voltage surge protections, and other expensive components. Accordingly, such stand-alone, small, isolated grids become expensive and are difficult to maintain, particularly in harsh environments. It would therefore be desirable to have an interface with a stand-alone grid which is reliable, low-cost, and easy to maintain.

BRIEF SUMMARY

A stand-alone DC power network is provided which ensures reliable power to a large variety of DC terminals, even with large fluctuations in the amount of power demanded at other of the terminals. An electric battery is provided that stores a DC power. The DC power of the battery is coupled to a DC power supply terminal which receives the battery power as an input and provides a plurality of different DC voltage levels as an output. Within the DC power supply are a plurality of DC to DC converters that each provide the selected voltage at their output terminals. Each of the DC output terminals is ranked according to the priority for supplying power to it from the battery. The circuit that provides power to the high priority terminals has a circuit design to ensure that the voltage remains constant at all times and that a specified current will always be above a selected value if there is any charge left in the battery. This ensures that target voltage will always available at the high priority power supply output terminals. On the other hand, a second level priority output terminal is provided designated as well. At the second priority output terminal the voltage is permitted to fluctuate as is the amount of current provided if other appliances attached to the DC power supply draw too much power or change the rate at which they draw power more rapidly than the battery can change the rate at which it outputs the additional power demand.

In one particular embodiment, a circuit is coupled to the second level priority output terminals. Current and voltage sensors are coupled to each of the terminals, the first priority terminals as well as the second priority terminals. In the event one of the second priority terminals attempts to draw additional power at a rate that would, if unchecked, cause a drop in the voltage and current output at the other terminals, then a current limit is placed on the second priority output terminal to prevent it from drawing any current beyond that which would cause a high priority output terminal to have a drop in its voltage or current supply.

According to one embodiment as described herein, the type of battery used can be selected from any one of a wide variety of different types, including lead-acid batteries, lithium-ion, nickel-cadmium, nickel-zinc, or other battery type.

DETAILED DESCRIPTION

Figure 1:
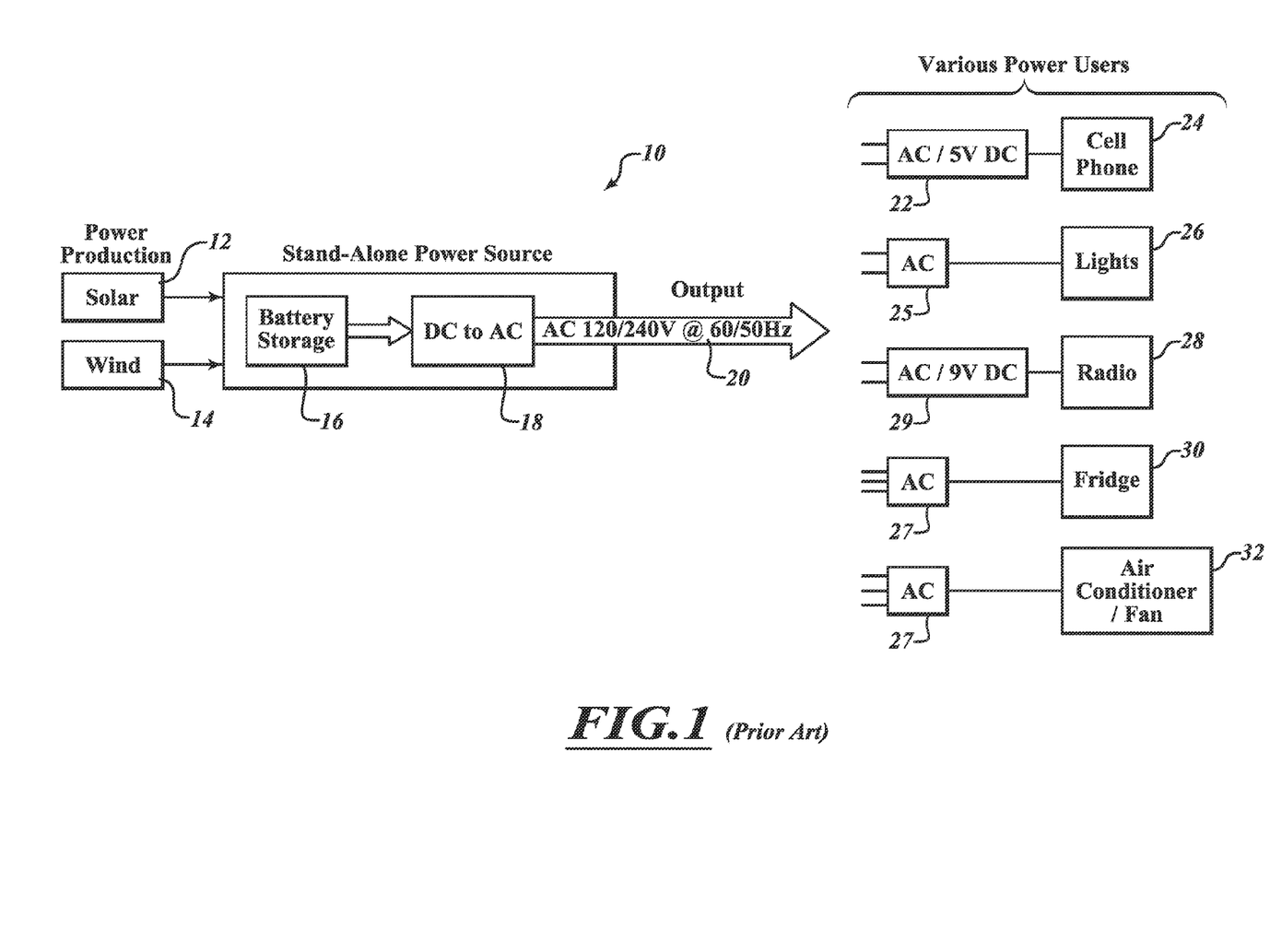
FIG. 1 illustrates a prior art stand-alone power grid.

FIG. 1 illustrates a stand-alone power source 10 of a type commonly used in the prior art. This stand-alone power source 10 receives power from any number of generation systems, which may include a solar power supply 10 or a wind power supply 14, such as a wind turbine. Of course, other sources of power may also be provided, such as biomass, diesel generators, human-powered generators, geothermal sources, and other types of electric power generation systems. One aspect of these various types of power productions is that they are often not consistent in always producing the same amount of power. Additionally, from time to time, they may stop producing power altogether, such as a wind turbine when the wind stops blowing, or a solar power generation system on a dark night. Accordingly, it is common in such stand-alone power systems 10 to have battery storage 16 for storing electrical power. Current battery storage systems can only store power in DC form, and may range in voltages from 24-volt systems, 48-volt systems, or, in some cases, 12-volt systems. When it is desired to use the power stored in the battery 16, the DC voltage is input to an inverter 18, and the inverter 18 converts it to an AC system that is of the type used in the local community. If such a system is in the U.S., it would generally convert it to a 120-volt system at 60 Hz. Alternatively, it may convert it to 220 volts at 50 Hz if it is in the European system. In some emerging countries, such as those in Africa, as well as isolated locations in Cambodia and other Asian countries, the output voltage may be 240 volts at 60 Hz or, alternatively, 120 volts at 60 Hz, or in some systems an output supply of neither. With the AC voltage being provided, the various power users will therefore attach their system to the AC output 20 in order to receive electrical power.

One of the primary users of electric power in the stand-alone systems in remote isolated grids are cell phones. With current stand-alone grids, a user of a cell phone will use an AC plug 22 to plug into the AC output 20. The AC plug 22 will of necessity include a converter, which will convert the AC input voltage to the appropriate charge voltage for the cell phone 24, such as 5 volts DC, 3.8 volts, or some other voltage value, depending on the type of battery in the cell phone 24. Other appliances using the power include lights 26, radios 28, refrigerator 30, an air conditioner or fan 32. Each of these has an AC plug that will mate with the output 20, the AC terminals being in some instances standard terminals 25, such as shown for the lights 26. A high-voltage terminal such as a 240-volt terminal, for high power requirement appliances such as refrigerators, air conditioners, and ovens, may also be used. Various other items, such as a radio 28 may need 9 volts for its proper operation and, accordingly, a custom AC terminal 29 will plug into the AC output 20 and then convert the voltage to 9 volts for the radio. The inventor has realized that there are a number of significant disadvantages with the prior art as explained in FIG. 1. The inventor, by review of the various systems, has realized that there are reliability issues in the conversion from the DC to AC carried out in the inverter 18. In addition, there is significant power loss in the various systems which convert AC to a DC system. This is one of the more significant losses of power, since many of these conversion circuits are very inefficient. For the standard cell phone user, there is not a high concern for efficient use of electricity, since, to the cell phone user, they are normally plugging into the grid. However, if this is a stand-alone power source with a very limited amount of power, if there are significant losses in the AC to DC conversion terminals 22, 29, and others which is very common with cell phones and other small appliances, then significantly more power is drawn from the battery 16 than is needed, and other members of the community will not be able to have use of the power. Similar inefficiencies arise with the lights, refrigerator, air conditioner, or other items. Lights actually operate brighter on a lower overall power if driven by DC power. Yet current systems provide AC for ease of transportation and to match with the overall grid. In addition, refrigerators and air conditioners driven by DC can be more efficient than AC-driven. Such DC-driven appliances are frequently available for use in the remote grid situations. Accordingly, the inventor has realized that significant power savings can be obtained by not converting from the DC to the AC and then back to the DC for only some of the items, while using AC for others. In addition, significant savings can be made in the cost of equipment, as well as reliability improved by avoiding a conversion to multiple levels of AC and then a conversion back to multiple levels of DC. In addition, the AC to DC converters 22 and 29 are usually of low reliability. One of the high failure points in a charging system is the AC to AC, DC to AC or AC to DC conversion systems are the low cost transformers which in a harsh environment are subject damage, such as loss of insulation. The components are also subject to damage due to being dropped, excessive heat, humidity and breaking of the electrical connection from the DC output to the respective user, such as a cell phone or radio.

Figure 2:
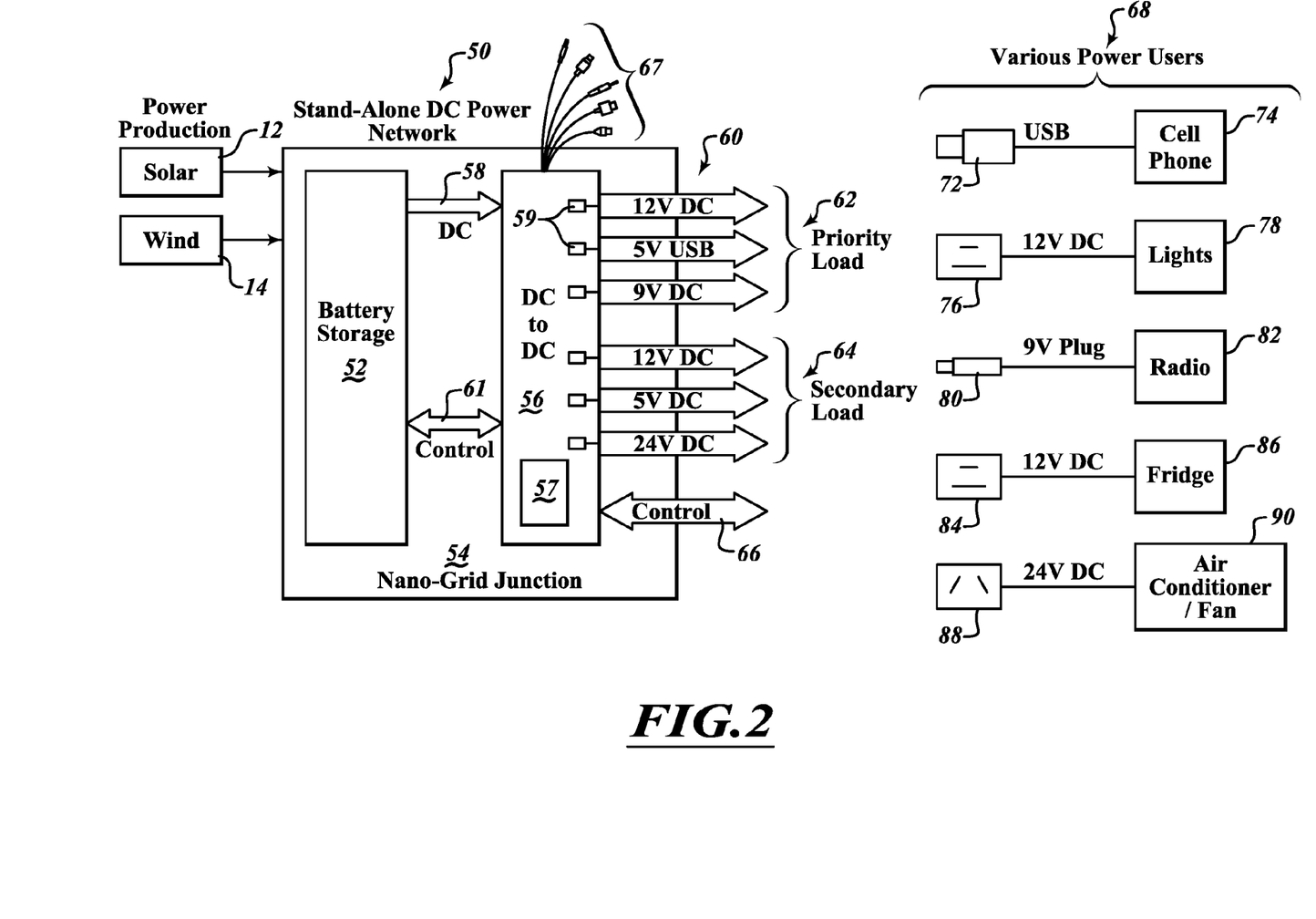
FIG. 2 illustrates a stand-alone DC power grid according to various embodiments as described herein.

FIG. 2 illustrates an embodiment of a stand-alone DC power grid according to principles of the various embodiments as disclosed herein. Most of the appliances that require a power supply from a grid can also work on DC power, and do not require high-voltage AC sources. In remote communities, often the primary users of power are low-power DC systems. Typical light bulbs are LEDs which are DC driven. The primary components being charged might be mobile cell phones, tablets, DC-driven televisions, DC fans, or small refrigerators which are DC driven. In addition, a number of networks might be driven, all of which require DC to operate. This might include Wi-Fi network circuits, GSM network boxes, Ethernet connections, and other systems. FIG. 2 illustrates a stand-alone DC power network 50 that provides power of the type which is most useful to remote communities that are isolated from a large electrical grid.

The stand-alone DC power network 50, which may also be termed a nano-grid, receives power from multiple power sources such as solar 12, wind 14, and the various other power sources mentioned with respect to FIG. 1. The stand-alone DC power network 50 includes a battery storage system 52 and a nano-grid junction system 54 which interfaces with a DC to DC power supply 56. The nano-grid junction system 54 has a battery 52 that provides DC power out on a DC line 58. The battery output 58 can be controlled via control signals which are exchanged on a control bus 60 that carries signals between the battery storage system 52 and the DC to DC power supply 56.

The stand-alone DC power network 50 permits the energy generation consumption to be decentralized down to the household level, with the significant advantage of minimizing the infrastructure cost and matching the power output capabilities to the various load requirements. Accordingly, it provides a system that does not provide high voltages, such as 120 volts, 240 volts, and the like, on an AC system, which may rapidly drain the battery. Instead, it provides only DC outputs. This provides a number of advantages. Suppose a person plugs a high power consuming item into the stand-alone grid for something which has low value to the community. For example, consider a large amount of power which might be drawn by a hair dryer to blow-dry a person's hair, as compared to the use of that same power which could fully charge over 100 cell phones, drive a water pump to pump many gallons of water, or operate an refrigerator for several hours to provide cooling of food to prevent spoilage. A hair dryer may draw over 1,500 watts, whereas a single cell phone can be charged on less than 3-4 watts. Accordingly, since the DC to DC power supply 56 provides only DC outputs, a number of high-power uses which may potentially rapidly drain the battery 52 are not able to connect to the system, and thus, the system is able to preserve the power for higher priority uses based on its pure DC output structure. In addition, the system has controls for unloading low-priority appliances when a maximum power drain is reached. Only high-priority equipment is given access to the power if a large power draw or if the charge stored in battery 52 is near to being depleted.

The DC to DC power supply 56 has at least two levels of power output terminals 60. A first set of power output terminals are first priority power suppliers grouped in a priority grouping 62 and a second set of power terminals 60 are in a second priority level of power supply output terminals in group 64. In addition, an internal processor 57 or a control input 66 can control the amount of power that is provided to any one of the terminals 60. Within the DC power supply 56 are a plurality of DC to DC converters 59 that each provide the selected voltage at their output terminals 62 and 64.

The priority load outlets 62 are constructed and wired in the circuit with the DC to DC power supply 56 to have first priority for the supply of current at their output and to have first priority for drawing power from the battery storage unit 58. The secondary load outputs 64 provide their voltage and the requested current unless the requested current begins to draw down the battery at such a rate that it may reduce the power on the other high priority loads 62, in which event the current provided to the secondary load terminal 64 is reduced to avoid causing a loss of power on the first priority load terminal 62. In one example, a feedback loop is used to control the behavior of the load and how much current it is allowed to draw. Various embodiments will be explained in detail.

A battery 52 is considered from the view of a power user as being able to provide any desired current draw via each output terminal 60. Thus, the various power users 68 consider that any current they request will be available and they can draw on this power at any time in order to supply their needs at the selected voltage. In real life situations, however, there are limits to how rapid the current can change as it is provided out of the battery 52 on the output terminal 58. The current cannot rapidly increase in a step function. The rate at which the current can increase will be limited based on the size of the power delivery bus 58, the circuits inside the DC to DC power supply 56, as well as internal inductance, resistance, and capacitance which are present in such circuits and within the battery 52 itself.

Examples of changes in power being required will be provided for ease of reference. Assume in a first example that a 24-volt DC air conditioner 90 is plugged via a 24-volt DC terminal 88 into the 24-volt DC terminal 60 that is part of the second priority load 64. While it is plugged into the 24-volt DC terminal, the air conditioner 90 may be off for periods of time and then turned on suddenly to cool a room. At the instant the air conditioner 90 is turned on, it will draw a very large amount of power, nearly instantaneously in order to start the motor running, turn on the fan, start the compressor, and overcome internal capacitances as these various components start up. In addition, there are other circuits inside an air conditioner 90 which draw large amounts of power on start-up. As a result, the power which is being drawn from the DC power supply 56 may suddenly increase a large step function value to be over one hundred or a few thousand times greater than it was in the previous moment. This sudden demand for power by the air conditioner 90 would have a tendency to cause the voltage provided at all the other terminals 60 to drop by some amount. In addition, the current being provided to all these other terminals 60 will also drop since the 24-volt DC power terminal is demanding a large current flow which may exceed the instantaneous current that can be provided via power bus 58.

When this happens, the tendency would be for the power provided at all the other terminals 60 to be reduced. For example, if lights 78 are plugged in via the 12-volt DC terminal 76 to the 12-volt DC output terminal 60, the lights may dim significantly or even go out briefly until the battery 52 has sufficient time to increase its current output and the circuits in the DC power supply 56 have time to respond and return the desired power level to the 12-volt power supply after the large step increase in current draw from the 24-volt DC terminal caused by the air conditioner 90. In many instances, it is desired to avoid such a flickering of the lights when a large power demand appliance comes online. Of course, the reduction in power may occur at any one of the terminals, for example, the radio 82 may briefly go silent if the power is suddenly reduced at the 9-volt terminal. Similarly, the cell phone may cease charging since the power is being drawn primarily by the 24-four volt DC air conditioner 90. According to the embodiments as disclosed herein, the desire is to provide a low-cost system which is within the affordability range of a single home or a small group of homes and can operate reliably even if one of the power users plugs in an appliance which may demand a large amount of current at a step increase rate. One goal is to provide a system that is both affordable and has high reliability. The system will be built with easily available replacement parts and have low maintenance so that it can be used by households in remote locations, far from a large network power supply, or if the network power is intermittent. According to the embodiments described herein, a processor 57 is coupled to the DC to DC power supply 56 which senses the voltage and current draw that is being requested at each of the terminals 60. The amount of power, both current and voltage, that is provided via the DC output cable 58 is known based on the type of battery 52 and the size of the various components. In addition, the rate at which the power that is output from battery 52 can change to increase or decrease is also a physical characteristic of the system which is known and is programmed into the memory of the processor 57 inside the DC power supply 56. The processor 57, with the memory, is in the DC power supply 56 or, alternatively, it is coupled to the DC power supply 56 via the control line 66.

In particular, the processor 57 monitors the amount of power demanded at each of the secondary loads 64, as well as the power, both voltage and current being drawn from each of the primary terminals 62. In the event the power demand of a secondary load 64 is rapidly increased to a level that would, if unchecked, cause the power supplied to any first priority load 62 to decrease, the processor 57 will limit the amount of power that can be drawn from the secondary terminals 64. Thus, to the first priority terminal 62, there will be no change in the power being provided, even when the air conditioner is suddenly turned on. According to the various embodiments herein, the change in current which can be drawn by the 24-volt DC is limited to always be below a level which would cause the voltage in the first priority load circuits 62 to drop. Preferably, the processor 57 will prevent the attempted increase in power draw from the secondary load terminal 64 quickly enough that there is no disturbance in the supply of the power to the systems of the priority load terminal 62. Thus, when the air conditioner 90 first comes on, it may demand 20 amps at 24 volts DC. However, since drawing of 20 amps at 24 volts as a step function increase would cause a drop in the current supply to the primary load 62 and, potentially, a voltage drop on the primary load terminals 62, the processor 57 will limit the current which can be obtained by the air conditioner 90 to a lower level, such as 10 amps or 12 amps in the initial step draw in order to ensure the first priority loads 64 always stay at the specified voltage and current supply. When a new appliance 68 is plugged into a terminal 60, the processor 57 will demand more power from the battery 52 via the power supply 58 and will also send control signals via control bus 61 in order to increase the rate at which power can be provided from the battery storage 52. Within a short period of time, the current being provided to the 24-volt DC terminal 60 will ramp up towards 20 amps, so that within a short period of time, usually within a few seconds, the full 20 amps will be available for use by the air conditioner 90. The rate at which the current is permitted to ramp up to the increased amperes will be selected to ensure that it is not faster than the rate at which the DC power bus 58 can provide the additional current, and to ensure that the primary load terminals 62 are always supplied the full voltage and the full current as specified for which they need to supply. In one embodiment, a microprocessor 57 is used to control the output current and voltage levels at each output terminal and to direct the use of power to the high priority terminals is there is insufficient power. The microprocessor 57 can be used for DC/DC sensing and monitoring, load monitoring, load control, charge optimization for solar cells, battery monitoring, and the like.

In the event that the maximum power output that can be output from the DC battery 52 is reached, the low priority equipment that is coupled to the secondary load terminals 64 will be unloaded, and have the current provided being reduced. Thus, when maximum possible output power from battery 52 is reached, selected secondary loads, starting first with the 24-volt DC and then the 5-volt DC and then the 12-volt DC will have the amount of current provided to them decreased within the secondary load group of terminals 64, since these will be designated as only being available to drive low-priority appliances, such as air conditioner 90, refrigerator 86, or radio 82. On the other hand, the terminals in group 62 will be designated as high-priority loads, and any appliances which are coupled to them will be guaranteed to provide the specified power at the selected voltage and current, to the extent there is sufficient power remaining within battery storage unit 52. In particular, the priority load terminals 62 will be labeled at the output of the DC power supply 56 as high-priority terminals. In addition, in some embodiments, the priority of the terminals will be further grouped as to priority within the set of the high-priority terminals, such as first priority, second priority, and third priority, etc. Similarly, the priority of the terminals within the secondary load 64 may also be grouped as priority terminals, such as lowest priority, second lowest priority, third lowest priority, and the like. The user will decide which terminal to use based on the appliance plugged into the DC power supply 56. If the user has an appliance he/she wants to have power at all times, at a higher priority than other appliances, he/she will select a first priority power terminal. In the example shown in FIG. 2, the highest priority terminal is the 12-volt DC terminal. The processor 57 will ensure that 12 volts of DC at a selected current is always provided at this high-priority terminal 62. In the event that battery 52 becomes severely depleted and is nearly out of power, each of the other terminals will be shut down in order to ensure that the full 12 volts with a specified current level is provided at the highest priority terminal. The 12-volt DC terminal might be the type used for lights for selected parts of the home or for the DC power input for a computer power supply, or other critical functions which the homeowner decides are of the highest priority. The second priority terminal is the 5-volt USB terminal. This is the terminal which would be used to charge cell phones, run backup hard disk drive storage, operate cameras, operate some computer equipment, and the like. Generally, this is a very low current output terminal and therefore it is to be expected that even if the battery 52 is low on power, there will still be more than enough power to maintain the 5-volt USB terminal at the full 5 volts and also provide all the current demanded.

A second 12-volt DC terminal is also provided, which is of a secondary priority. This second priority 12-volt terminal may be used to drive other appliances in the home which, while important, are not as the highest priority of a computer or lights. The secondary load may be a refrigerator which is terminal 84 into the 12-volt DC socket of the secondary load 64.

A group of plugs 67 represent the type of plugs which may be provided as part of the high-priority load. These include various types of USB plugs, 3.5-volt plugs, 3.7-volt plugs, 9-volt plugs, any number of industry standard plugs at industry standard voltages of the many types known in the art.

In the embodiments shown, the examples for the high-priority terminal 62 are a 12-volt DC, a 5-volt USB, and a 9-volt DC. It will be appreciated that depending on the particular design, it may be preferred to have a 3.8-volt output USB, an 18-volt DC output, which is common for many laptop computers, a 6-volt DC output, or some other voltage available as the output from the DC power supply 56.

In one embodiment, the user has the option to select which of the power supplies will be selected as the first, second, or third priority. Specifically, input switches are provided at the input control 66 which provide input to the processor 57. The user, by selecting one or more switches, can selectively determine which of the priority loads has the highest priority, which one has the second priority, and which one has the third priority. In addition, the user can, if they wish, via control input 66 select one of the terminals in the secondary load system to move into the priority load set. For example, the user may desire to have two 12-volt terminals, both of which are of the highest priority. This may be in the instance of a remote medical facility that needs to keep the refrigerator at a cold temperature to keep medications always cool within a certain temperature range to avoid ruining the medicine. In addition, a nurse's station, urgent care facility or emergency service location will also need to keep the lights on at all times. Accordingly, the power supplied to such medical stations may be set to have two or more 12-volt DC outputs at the priority load and have the 9-volt DC as part of the secondary load group 64. Alternatively, a user may determine that the charging of cell phones is of low priority, but that the providing of air conditioning at certain selected times if of the highest priority, and may therefore select the 5-volt USB output to be in the secondary load group 64, so the cell phones are only charged if there is sufficient power after all other uses are met. In this selected design, if the air conditioner needs to be run, that the cell phone charging will be terminated so that the air conditioner 90 has sufficient power to maintain operation.

The processor 57 provides a power management control that will ensure that the power source which is ranked at the highest priority will always receive the power which is demanded through the terminal, and that in the event the total power drawn from the battery 52 approaches a maximum value, either instantaneously or over a steady state, that the priority loads 62 will always be held at the steady state-specified voltage and receive the current which is being demanded to be drawn.

One of the new teachings that is provided herein is that certain electrical terminals have a higher priority to deliver the specified voltage and current than other of the electrical terminals from the same DC power supply. In addition, a processor is provided which receives input from sensors to know the voltage level and current demand of each of the different terminals of the DC power supply 56. If the amount of power demanded at any one of the terminals would be sufficient to cause any other terminal of the DC power supply 56 to have a reduced voltage below the specified level, or less current than that which is specified, then action is taken to select which of the terminals will have the voltage reduced and which of the terminals will have the voltage remain the same. In the event the power being demanded is higher than that which can be supplied by the DC power supply 56 at any instant in time, then the lowest priority terminal has its voltage and current levels significantly reduced, or terminated completely, and thus providing additional power available to the first priority output terminals.

A processor which can accomplish the stated function can be designed based on the description as provided herein. In particular, such a processor 57 would have voltage and current sensors at each of the output terminals 60, such sensors being well known individually of themselves in the art. In particular, the processor 57 can monitor the energy consumption of each load at each terminal and track the power priority of each terminal. The use of the power source, battery 52 can be improved and if needed, optimized with software algorithms to increase system efficiency and power usage.

A USB terminal has sufficient pins that some can act as a data bus that provide feedback signals to the processor 57 of the current drawn by that particular load. In addition, each of the second priority terminals 64 will have a current limiting circuit coupled thereto and controlled by the processor 57. Various types of such current limiting circuits are known in the art, which may be switched into and out of the circuit as desired. For example, the current limiting circuit may include a reference current with a current mirror that restricts the amount of current to be provided at any given time, and that is controllable by enable and disable transistors. Other types of current limiting circuits of those which are available in the art may be connected to second priority output terminals 64 so that the current limiting circuits can be enabled or disabled as needed in order to limit current to the second priority load 64 if the sensors recognize that there is going to be an event which would cause the voltage on the first priority terminals 62 to drop.

Accordingly, the output can be tuned or deactivated depending on the instantaneous output power that is demanded from any particular source.

In one embodiment, the priority loads 62 are maintained at the specified voltage by providing galvanic isolation between the secondary power supply terminals 64. In particular, in this alternative design, the priority loads 62 will have a first ground connection which may be common between all of them. However, this ground will be electrically isolated from the ground of the secondary load 64. This will ensure that in the event there is a stray charge or stray power draw from either a positive or a negative source of the secondary load 64 that will not affect the first priority terminals 62. Accordingly, in one embodiment full galvanic isolation is provided between the priority load terminals 62 and the secondary load terminals 64 as additional protection to ensure that there are no current paths through which the secondary load may cause a disruption in the power supply of the priority loads. Further, in one embodiment there will also be galvanic isolation between the battery storage 52 and the DC power supply 56. In some instances, the DC ground of the battery 52 may float high or low depending on local conditions of the grid, which cannot be easily predicted or controlled. If the ground of the battery 52 begins to float up, then the total current provided on the DC output bus 58 may be reduced, even though such reduction may not be apparent at the priority load 62 if they share a common ground. Accordingly, in one embodiment there is full galvanic isolation between the battery storage 52 and the DC power supply 56 in order to ensure that any changes in battery ground will not disrupt the power provided at the specified voltage and current to the first priority terminals 62. In summary, in a first embodiment the entire system shares a common ground, with the battery, the priority load terminals 62, and the secondary load terminals 64 all having a common ground. In a first alternative embodiment, the circuits in the DC power supply 56 and the battery storage 52 share a common ground, as do the secondary loads 64, but the priority load terminals 62 are galvanically isolated from either of these two circuits to ensure that the specification for voltage and current is met at all times, even if unexpected events occur at these other sources. In a further alternative embodiment, the battery is galvanically isolated completely from the DC to DC power supply 56, and the priority loads and secondary loads may also be galvanically isolated from each other.

Figure 3:
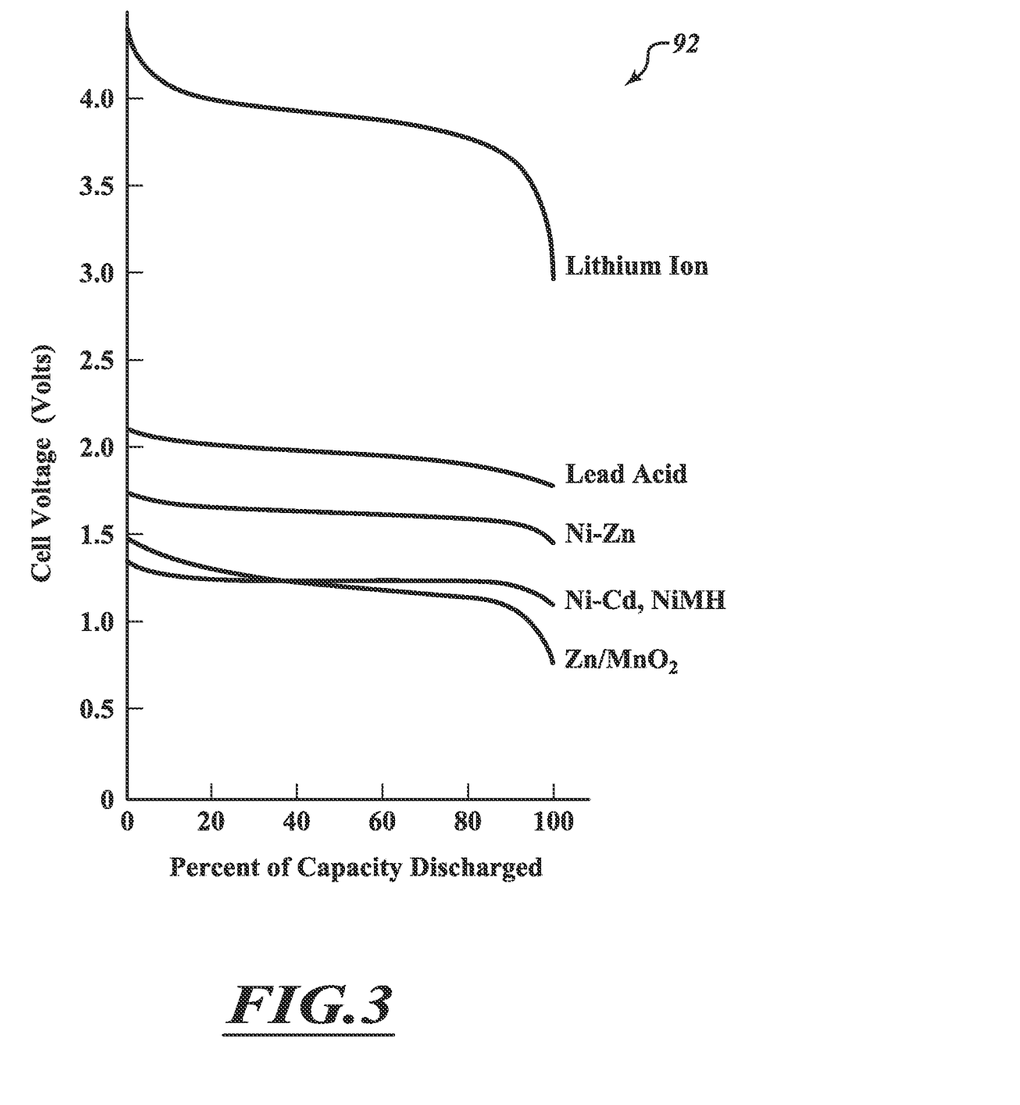
FIG. 3 illustrates a discharge curve for various types of battery storage systems.

FIG. 3 illustrates battery cell voltages and their discharge curves 920, which are well known in the art but which have particular application in the present invention. The battery discharge curves 92 as shown in FIG. 3 are stored in the processor 57. One benefit of the inventive nano-grid system 54 is that it is adaptable to many different types of battery storage 52. At each remote country site a different type of battery storage may be available. It may be difficult to ensure that only a certain type of battery storage is available. According to principles of the embodiments as discussed herein, this stand-alone DC network 50 has the benefit of being adaptable to many different types of battery storages, so that whatever type of storage is available at the site can be used with the network 50. For example, at some remote sites lead-acid batteries will available and be the preferred battery storage system. Lead-acid batteries are common throughout the world, relatively low in cost, and are sufficiently heavy duty to last for many years over many charge and discharge cycles. One disadvantage of the lead-acid battery is that they are quite heavy, and thus, while they are not adaptable for batteries in cell phones or radios, are often suitable for a stand-alone DC power grid is being charged via solar or wind at periodic times. An automotive grade 12V or 24V lead acid battery is low in cost, robust and widely available. Accordingly, in many instances the battery storage 52 that will be provided is a lead-acid battery. In other instances, a larger capacity battery with a smaller footprint may be desired, in which case a lithium-ion battery may be used. Alternatively, an easy-to-charge and rapid discharge battery may be provided, such as a nickel-cadmium battery. Other types of batteries are shown on the curve 92 in FIG. 3 including Ni—Zn, NiMH and Zn—$MnO_2$. Those batteries which are shown in FIG. 3 are the most common batteries which would likely be available for possible use at the stand-alone DC power grid 50, although of course other batteries of different types may also be provided, depending on the ones that are available at the location of the stand-alone power grid.

Each of the different types of batteries has particular characteristics which will affect the operation of the system and the providing of power via the DC power supply 56. As one example, each type of battery has a selected rate at which it can discharge current and at a rate at which it can rapidly change from outputting current at a first level to outputting current at a second level. As one example, Ni—Cd batteries have the characteristic that they are able to provide very large current outputs and also change the amount of current being provided very quickly, such that an extra current being demanded can be provided nearly instantaneously. On the other hand, lead-acid batteries have the characteristic that they are quite slow to change the amount of current that can be provided. While they have the capability to provide very high current flows, often well over 200 amps, the disadvantage is that they cannot rapidly change from providing 2 amps of current to in excess of 200 amps of current. Rather, a certain amount of time is required for the lead-acid battery to transition from providing low current to a high current. This is just one example of the different battery characteristics. In addition, each battery will have a different characteristic discharge curve. As can be seen, a lithium-ion battery generally has a higher overall cell voltage, and after just small percentage of discharge will drop 15% and then generally stabilize at a selected voltage, until it is over 85% discharged. However, once it has been discharged over 85%, the voltage provided will rapidly drop, in excess of 30% of the initial voltage, so that in the last 5% of charge provided by the lithium-ion battery, the voltage at which the power is provided is substantially reduced. This can be compared to the discharge curve of a lead-acid battery, which will reduce only slightly in the first 10% of discharge and then will be quite stable to gradually decrease until it reaches approximately 100% discharged. On the other hand, the discharge curve of Ni—Zn and Ni—Cd batteries are relatively flat almost all their entire discharge cycle until approximately fully discharged.

Each type of battery will have its own particular specifications and characteristics, which include such features as cell voltage, discharge curve, the amount of current that can be provided, the rate at which current can change over short periods of time, the number of times it can be recharged, a preferred recharge curve, a preferred discharge curve, as well as a number of other characteristics. According to embodiments of the system, the processor 57 has stored therein the characteristics of the various potential batteries which might be used for the battery storage 52. The processor 57 interacts through the control line 61 with the battery storage 52 in order to determine the type of battery which is used. The processor 57 conducts a number of tests via control line 61, which may include charge and discharge tests, current tests, current rate change tests, or other tests, in order to determine the type of battery and also the performance of that particular battery. The processor 57 can carry out a number of charge and discharge test patterns on the battery 52 in order to determine the rate at which it is able to change the current provided rapidly, in order to anticipate the control which may be required based on expected future demands that may be placed on the first priority terminal 62 and the second priority terminal 64. The processor 57, after carrying out the various tests of the battery storage 52, stores the battery characteristics within its memory so that it is able to control the operation of the DC power supply 56 and the providing of voltage and current to the first priority load 62 and the secondary load 64 based on the capabilities of the particular battery 52 which is connected at that time to the stand-alone DC power network 50. One particular benefit, therefore, is that the local community that is providing the battery storage has the freedom to provide whatever type of battery is most convenient for them. In some situations the user of the network 50, whether an individual home or a community of a dozen or more homes, may have a convenient and easy supply of lead-acid batteries. Accordingly, a lead-acid battery would be coupled to the network 50 to act as the storage device. On the other hand, another community may have a lower cost or easy supply of nickel-based batteries, such as Ni—Zn or Ni—Cd. In such a situation, the local user will use the nickel-based battery in the battery storage system 52. Another variation is that each battery may have different age, operating characteristics, and charge and discharge capabilities, depending on the battery itself, which will greatly affect the quality of the battery. For example, a brand-new lead-acid battery will have a significantly better charge and discharge cycle time than an older and heavily used lead-acid battery. Each particular battery, even within the same type of battery, will have its own operational curve, depending on the temperature of the battery, its age, and many other characteristics.

One advantage of the present system is that the user of the stand-alone DC network 50 is able to provide any type of battery storage 52 which is convenient for them and which is the easiest to obtain and the lowest cost. The processor 57 interacting through control 61 will query the battery 52 in order to determine the type of battery and its operating characteristics, which will be stored in the memory and then used to refine the output levels from each terminal of the DC power supply 56. This therefore frees the user from being limited to one particular type of battery 52, and gives them the flexibility to use any type of battery for the stand-alone DC power network.

The curves shown in FIG. 3 are representative of those that would be for a single cell for the particular type of battery. As will be appreciated, in most systems a number of cells will be connected in series to provide the desired DC power availability at the output 58. For example, in a common system, the battery storage 52 will output 48 volts or, in some instances, 24 volts. In such a situation, 12 or 6 lithium-ion batteries may be placed in series. Alternatively, 12 or 24 lead-acid battery cells may be placed in series. As will be appreciated, the battery storage 52 may have arranged therein the appropriate number of cells for the desired output voltage, whether in series or in parallel. In most systems it would be expected that there will be a large number of cells in parallel in order to provide a high current output, and in addition, that banks of the cells would be arranged in series to provide the desired output voltage at output power supply 58. One benefit of the inventive system 50 is that it is adaptable for any number of types of battery storage cells and in any configuration. For example, the battery storage 52 can have as few as 1 or 2 lithium-ion cells or 3 lead-acid cells. The control 60 will recognize the voltage and current output capabilities of the battery storage 52 and will store this in the memory. Thereafter, the processor 57 will limit the power that can be drawn from the various loads based on the capability of the battery storage 52.

In the diagram as shown, the control communication between the battery 52 and the processor 57 is shown as a separate bus line 61 for ease of understanding. It will be appreciated that in most embodiments, this control line 61 may be identical to the power supply line 58, and not be provided as a separate line. In particular, the processor 57, instead of having a separate control bus 61, may have voltage and current sensors coupled to the power supply line 58. In such a system, the processor 57 would monitor the voltage and current characteristics of the power that is provided on the actual power line 58 and, using those characteristics, compare them to the stored data characteristics it has for the different types of cells and the specifications of the cells in order to determine the type of storage cell being used, the number of storage cells in series or parallel, the charge and discharge rates, and various other characteristics of the battery storage 52. Accordingly, while a separate control line 61 is available in some embodiments and is preferred, in some low-cost embodiments the control 61 and the power supply 58 will be one and the same, and the processor 57 will use the information which is obtained during operation of the system itself in order to extract the characteristics of the battery in order to provide better control of the output through the priority load 62 and the secondary load 64. One of the primary characteristics of the inventive stand-alone DC network 50 is that it will be very reliable. The DC to DC power supply 56 has a high reliability, even in harsh environments. The reliability can be increased by use of galvanic isolation between various of the components, as has previously been discussed. For some of the circuits, such as the 5-volt USB, the galvanic isolation can be an opto-electric isolation, since these types are reliable, and can be used when high current is not needed. In other embodiments, a transformer will be used for galvanic isolation. Phototransistors are often used to drive high voltage DC networks, and can be used to provide galvanic isolation for various ones of the circuits if desired. Of course, other types of galvanic isolation can be used if desired, such as magnetoresistive, capacitor, and the like; however in most systems it would be appreciated that the most likely galvanic isolation, if used, will be optical or with a transformer. In most systems, galvanic isolation will not be necessary and will not be used; however this is an option which is available in the event the DC power network 50 will likely be in a harsh environment in which the ground level of any one of the output terminals 60 or the battery may be subject to wide swings as compared to other ones of the output terminals.

The system is designed with high modularity, namely the individual components can be replaced easily and switched in and out easily. The battery 52 can have a universal connection at power bus 58 so that different types of power sources can be easily plugged into the system, including power from a large grid. One benefit of this system is that if the single home or local community using the DC power supply 56 is sometimes able to obtain power from a large grid, this can be one of the power sources to battery 52. This can hold the battery fully charged and effectively let power from the grid be provided on a pass-through basis via the battery to the DC supply 56.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A stand-alone DC power network comprising:
an electric battery providing a DC power output;
a DC power supply coupled to the battery to receive DC power as an input from the battery and provide a plurality of different DC voltage levels as an output;
a plurality of DC to DC power convertors in the DC power supply;
a plurality of DC power output terminals comprising a first plurality of high priority power supply terminals and a second plurality of low priority power supply terminals coupled to the DC to DC power converters, respectively, to provide DC power to respective loads at different voltages; and
a processor coupled to each of the DC power output terminals, that senses both the voltage and current that is being provided at each respective terminal, and that ensures the voltage remains constant and that the available current will be above a selected value if there is any charge left in the battery.

2. A stand-alone DC power network comprising:
an electric battery providing a DC power output;
a DC power supply coupled to the battery to receive DC power as an input from the battery and provide a plurality of different DC voltage levels as an output;
a plurality of DC to DC power convertors in the DC power supply;
a plurality of DC power output terminals coupled to the DC to DC power converters, respectively, to provide DC power to respective loads at different voltages, a plurality of DC power comprising:
a first plurality of high priority power supply terminals;
a second plurality of low priority power supply terminals; and
a sensor to determine whether a selected power is available to be provide to each of the plurality of high priority terminals; and
a current limit circuit coupled to the low priority terminals and acting to limit the amount of current being provided to the low priority terminals in the event there is not sufficient current to provide the selected power to the high priority terminals; and
a processor coupled to each of the DC power output terminals and sensing both the voltage and current that is being provided at each respective terminal.

3. A method of providing power to a plurality of DC power terminals from a single battery comprising:
storing in a memory a specified voltage and current to be provided to a first DC power terminal from the battery;
storing in the memory a specified voltage and current to be provided to a second DC power terminal for the battery;
connecting a load to the first DC power terminal;
connecting a load to the second DC power terminal;
sensing the voltage and current being provided at the first DC power terminal;
sensing the voltage and current being provided at the second DC power terminal;
reducing the current that is provided to the second DC power terminal in the event the current attempted to be drawn by the load would cause the voltage or current being provided to the first DC power terminal to drop below a select value for either one.

4. The stand-alone DC power network of claim 1 wherein the processor demands more power from the electric battery in the event the power demand of a low priority power supply terminal would cause the power supplied to a high priority power supply terminal to decrease.

5. The stand-alone DC power network of claim 1 wherein the processor decreases the amount of current provided to a selected terminal within the second plurality of low priority power supply terminals in the event the maximum power output that can be output from the electric battery is reached.

6. The stand-alone DC power network of claim 5 wherein the high priority power supply terminals are further grouped as to priority within the set of the high priority power supply terminals;
wherein each of the other terminals other than the highest priority power supply terminal are shut down in the event that electric battery becomes nearly depleted.

7. The stand-alone DC power network of claim 6 wherein the user can choose the highest priority power supply terminal from the plurality of high priority power supply terminals.

8. The stand-alone DC power network of claim 1 wherein the processor reduces the voltage and current provided to the lowest priority power supply terminal in the event there is not sufficient power to provide the power that is demanded by the high priority power supply terminals.

9. The stand-alone DC power network of claim 1 wherein the processor is configured to recognize the voltage and current capabilities of the electric battery that provides the power to the system.

10. The stand-alone DC power network of claim 9 wherein the processor limits the power being provided to the low priority power supply terminals based on the capabilities of the electric battery, and the sensed voltage and current used by the high priority power supply terminals.

11. A method of providing power to a plurality of DC power terminals from a single battery comprising:
- storing in a memory a specified voltage and current to be provided to a first plurality of high priority DC power terminals from the battery;
- storing in the memory a specified voltage and current to be provided to a second plurality of low priority DC power terminals for the battery;
- connecting a load to the first plurality of high priority DC power terminals;
- connecting a load to the second plurality of low priority DC power terminals;
- sensing the voltage and current being provided at the first plurality of high priority DC power terminals;
- sensing the voltage and current being provided at the second plurality of low priority DC power terminals;
- ensuring that the voltage remains constant and that the available current will be above a selected value for each of the first plurality of high priority DC power terminals if there is any charge left in the battery.

12. The method of providing power to a plurality of DC power terminals from a single battery of claim 11 further comprising:
- demanding more power from the electric battery in the event the power demand of a second plurality of low priority DC power terminal would cause the power supplied to any first plurality of high priority DC power terminal to decrease.

13. The method of providing power to a plurality of DC power terminals from a single battery of claim 11 further comprising:
- decreasing the amount of current provided to a selected terminal within the second plurality of low priority DC power terminals in the event the maximum power output that can be output from the electric battery is reached.

14. The method of providing power to a plurality of DC power terminals from a single battery of claim 13 further comprise:
- storing an indication of the highest priority DC power terminal within the set of the high priority DC power terminals;
- shutting down each of the other terminals other than the highest priority DC power terminal in the event that battery becomes depleted.

15. The method of providing power to a plurality of DC power terminals from a single battery of claim 11 further comprise:
- reducing the voltage and current level of the lowest priority DC power terminal in the event there is not sufficient voltage or current to provide the selected power to the high priority DC power terminals.

16. The method of providing power to a plurality of DC power terminals from a single battery of claim 11 further comprising:
- recognizing the voltage and current capabilities of the electric battery storage.

17. A method of providing power to a plurality of DC power terminals from a single battery of claim 11 further comprise:
- limiting the power being provided to the low priority DC power terminals based on the capabilities of the electric battery, and the sensed voltage and current.

* * * * *